US012487308B2

(12) United States Patent
Zeller et al.

(10) Patent No.: US 12,487,308 B2
(45) Date of Patent: Dec. 2, 2025

(54) METHOD FOR SLICE-SPECIFIC CORRECTION OF SCAN DATA RECORDED FOR AT LEAST TWO SLICES SIMULTANEOUSLY BY MEANS OF AN ECHO-PLANAR SIMULTANEOUS MULTI-SLICE TECHNIQUE

(71) Applicant: Siemens Healthineers AG, Forchheim (DE)

(72) Inventors: Mario Zeller, Erlangen (DE); Adam Kettinger, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 163 days.

(21) Appl. No.: 18/227,353

(22) Filed: Jul. 28, 2023

(65) Prior Publication Data

US 2024/0036142 A1    Feb. 1, 2024

(30) Foreign Application Priority Data

Jul. 29, 2022    (DE) ..................... 10 2022 207 891.8

(51) Int. Cl.
| | | |
|---|---|---|
| *G01V 3/00* | (2006.01) | |
| *G01R 33/483* | (2006.01) | |
| *G01R 33/567* | (2006.01) | |

(52) U.S. Cl.
CPC ..... *G01R 33/5676* (2013.01); *G01R 33/4833* (2013.01)

(58) Field of Classification Search
CPC ............ G01R 33/3607; G01R 33/5608; G06T 11/005; G06T 11/006; G06T 2211/424
(Continued)

(56) References Cited

U.S. PATENT DOCUMENTS 6,043,651 A    3/2000 Heid
9,329,254 B2    5/2016 Pfeuffer
(Continued)

FOREIGN PATENT DOCUMENTS

DE    102016218955 B4    2/2019
DE    102018216774 A1    4/2020
(Continued)

OTHER PUBLICATIONS

Setsompop, Kawin et al.: "Blipped-Controlled Aliasing in Parallel Imaging for Simultaneous Multislice Echo Planar Imaging with Reduced g-Factor Penalty"; Magnetic Resonance in Medicine, vol. 67, pp. 1210-1224; 2012.
(Continued)

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

In a method for slice-specific correction of scan data recorded for at least two slices simultaneously of an examination object using an EPI-SMS technique, navigator signals encoded in a slice selection direction using a bipolar readout gradient for the at least two slices temporally after a RF excitation pulse radiated into the examination object and temporally before the recording of scan data to be corrected may be simultaneously recorded. Mean navigator signal(s) from at least two of the recorded navigator signals of a same polarity may be determined. Single-slice navigator signals may be determined based on the mean navigator signal and a navigator signal having been recorded with the same polarity as the mean navigator signal(s), but with a different slice selection encoding. Slice-specific correction data from the single-slice navigator signals may be determined, and scan data may be corrected based on the slice-specific correction data.

20 Claims, 6 Drawing Sheets

(58) Field of Classification Search
USPC .......................................................... 324/309
See application file for complete search history.

(56) References Cited

U.S. PATENT DOCUMENTS

| | | | |
|---|---|---|---|
| 10,162,037 | B2 | 12/2018 | Zeller et al. |
| 10,520,569 | B2 | 12/2019 | Zeller |
| 10,557,903 | B2 | 2/2020 | Carinci et al. |
| 10,634,752 | B2 * | 4/2020 | Li .................... G01R 33/5635 |
| 11,255,940 | B2 | 2/2022 | Zeller |
| 2016/0266222 | A1 * | 9/2016 | Nittka .................. G01R 33/543 |
| 2020/0103484 | A1 * | 4/2020 | Zeller ................. G01R 33/4835 |
| 2022/0099780 | A1 | 3/2022 | Kettinger et al. |

FOREIGN PATENT DOCUMENTS

| | | | |
|---|---|---|---|
| EP | 3627172 A1 | | 3/2020 |
| JP | 2015084893 A | * | 5/2015 |

OTHER PUBLICATIONS

Zahneisen, Benjamin et al. "Three-Dimensional Fourier Encoding of Simultaneously Excited Slices: Generalized Acquisition and Reconstruction Framework," Magnetic Resonance in Medicine, vol. 71, No. 6, pp. 2071-2081; Jun. 2014; https://doi.org/10.1002/mrm.24875.

Breuer, Felix A. et al.: "Controlled Aliasing in Parallel Imaging Results in Higher Acceleration (CAIPIRINHA) for Multi-Slice Imaging"; Magnetic Resonance in Medicine, vol. 53, pp. 684-691; 2005.

* cited by examiner

METHOD FOR SLICE-SPECIFIC CORRECTION OF SCAN DATA RECORDED FOR AT LEAST TWO SLICES SIMULTANEOUSLY BY MEANS OF AN ECHO-PLANAR SIMULTANEOUS MULTI-SLICE TECHNIQUE

CROSS REFERENCE TO RELATED APPLICATIONS

This patent application claims priority to German Patent Application No. 10 2022 207 891.8, filed Jul. 29, 2022, which is incorporated herein by reference in its entirety.

BACKGROUND

Field

The disclosure relates to a method for slice-specific correction of scan data recorded for at least two slices simultaneously by means of an echo-planar simultaneous multi-slice technique.

Related Art

Magnetic resonance technology (hereinafter, the abbreviation MR stands for magnetic resonance) is a known technology with which images of the interior of an examination object can be generated. Expressed simply, for this purpose, the examination object is positioned in a magnetic resonance device in a relatively strong, static, homogeneous main magnetic field, also known as the B0 field, with field intensities of 0.2 tesla to 7 tesla or more, so that its nuclear spins become oriented along the main magnetic field. In order to trigger nuclear spin resonances that are measurable as signals, high frequency excitation pulses (RF pulses) are radiated into the examination object and the nuclear spin resonances produced are measured as so-called k-space data and, on the basis thereof, MR images are reconstructed or spectroscopic data is established. For position encoding of the scan data, rapidly switched magnetic gradient fields, known as gradients for short, are overlaid on the main magnetic field. A scheme that is used which defines a temporal sequence of RF pulses to be radiated in and gradients to be switched is known as a pulse sequence (scheme) or sequence for short. The recorded scan data is digitized and stored as complex number values in a k-space matrix. From the k-space matrix occupied with values, an associated MR image can be reconstructed, for example, by means of a multi-dimensional Fourier transform.

One of the fastest known MR recording techniques is so-called echo-planar imaging (EPI), in which following an RF excitation pulse, an oscillating, that is bipolar, readout gradient is used in which each change of the polarization direction of the gradient refocuses the transverse magnetization as far as the T2* decay allows, and thereby generates a gradient echo. In other words, by way of the switching of the bipolar readout gradient following an RF excitation pulse within the free induction decay (FID) following the excitation or if additionally an RF refocusing pulse is radiated in following the RF excitation pulse, within the thereby generated spin echo, an echo sequence of rising and falling gradient echoes with alternating sign is generated. EPI pulse sequences can be used as a so-called single-shot method, in which all the scan data for generating an image of a subvolume, e.g. a slice of the examination object under investigation is recorded following just one RF excitation pulse.

Due to the alternating polarity of the readout gradient, the scan data obtained from the gradient echo signals must be sorted into a raw data k-space matrix in such a way that the sorting-in direction alternates from line to line of the raw data k-space matrix. If, herein, even only slight deviations occur from line to line, e.g. due to delays in the gradient switching or eddy currents, this leads to so-called N/2 ghosts, i.e. in an image matrix of N×N points, the actual image is mapped again, displaced by N/2 in the positive and the negative direction relative to the image matrix center, specifically, in general with different intensity. For the correction of such N/2 ghosts, it is known, for example from U.S. Pat. No. 6,043,651, to record three navigator signals while switching a bipolar readout gradient, with which a correction of phase displacements of zeroth and first order can be carried out in the readout direction between gradient echoes recorded with different polarity, which can correct displacements of this type. For this purpose, a correlation of the recorded navigator signals in the image space is used in order to determine correction factors which are used in a reconstruction of image data from the gradient echoes recorded as scan data in a raw data k-space matrix, in order to correct the aforementioned displacements in the raw data k-space matrix.

A further phase correction method named DORK for correcting displacements caused by temporal variations, e.g. a drift, of a basic magnetic field applied during an EPI scan in which a navigator signal is recorded is known, for example, from U.S. Pat. No. 9,329,254B2. Therein, an evolution of the gradient echoes that have been recorded with one polarity is compared with an evolution of the gradient echoes which have been recorded with the other polarity over successive recordings of raw data k-space matrices. Typically, in such a DORK correction, averaging is undertaken over an entire image volume.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
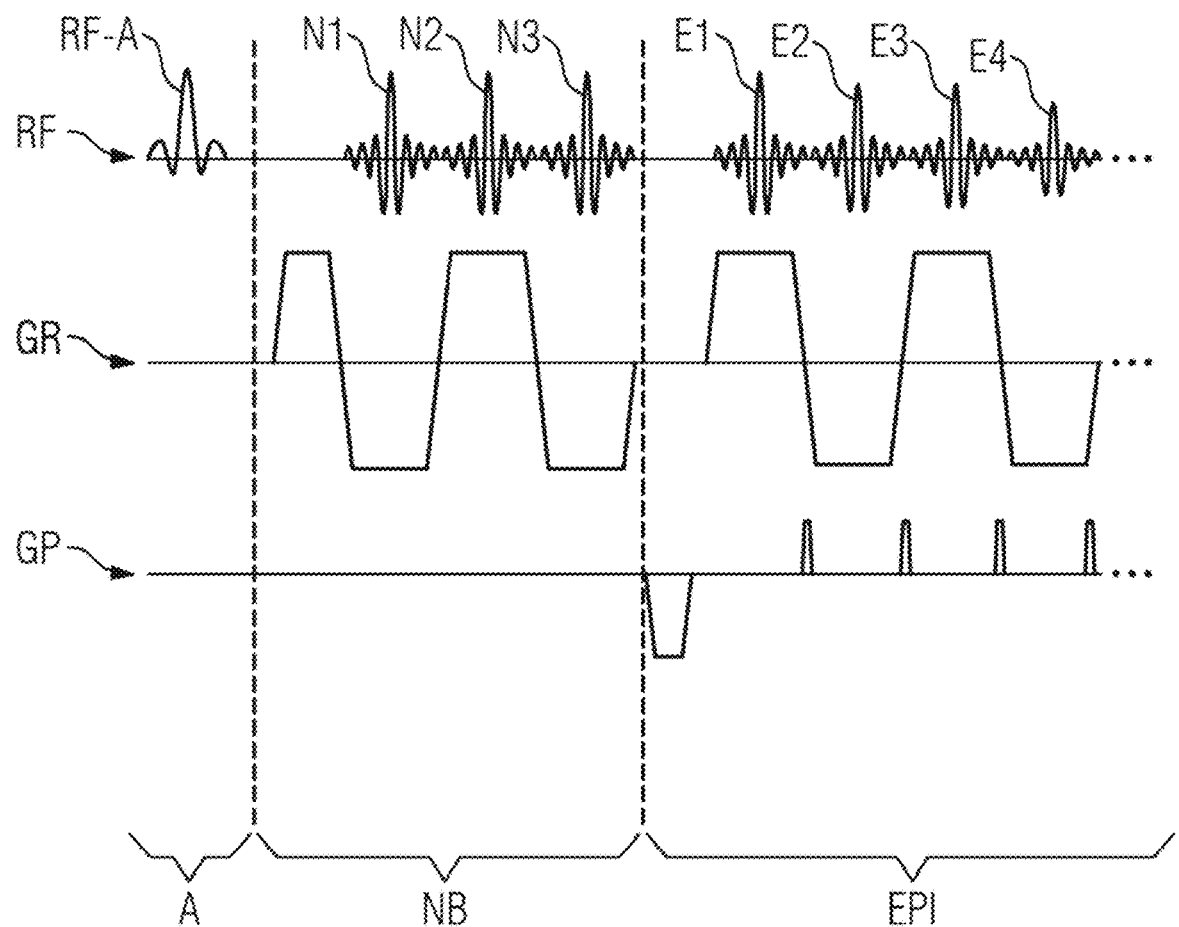
FIG. 1 shows a schematic pulse sequence diagram for generating and recording navigator signals N1, N2, N3 for correcting echo signals recorded by means of an EPI technique.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

FIG. 1 shows a schematic pulse sequence diagram which illustrates the temporal sequence of RF pulses and (RF) echoes generated, in relation to the gradients to be switched, in the readout direction (GR) and the phase encoding direction (GP) of an EPI pulse sequence with generation and recording of navigator signals, which can be used for conventional correction methods described in the "Related Art" section above. A representation of the gradients to be switched in the slice direction has been omitted. In the example shown, in a navigator block NB, by switching bipolar readout gradients (GR), three navigator signals N1, N2, N3 are generated as gradient echoes after an RF excitation pulse RF-A. In the phase encoding direction (GP), no gradients are switched in the navigator block NB, i.e. during the generation and the readout of the navigator signals N1, N2, N3. Only after the recording of the navigator signals N1, N2, N3 does the generation and recording of scan signals E1, E2, E3, E4, . . . for the imaging in accordance with an EPI technique begin. In the example shown, only one RF excitation pulse RF-A is shown in the excitation block A. However, a plurality of RF pulses can be radiated in within the excitation block A, for example also at least one RF refocusing pulse.

On the basis of such navigator signals N1, N2, N3, both a correction of N/2 ghosts, as mentioned above, and also a DORK correction, also mentioned above, can be carried out.

The wish for ever faster MR recordings in the clinical environment is leading to a resurgence of methods in which a plurality of images is recorded simultaneously. In general, these methods can be characterized in that at least during a part of the scan, targeted transverse magnetization of at least two slices is used simultaneously for the imaging process ("multi-slice imaging" or "slice multiplexing"). In contrast thereto, in the established "multi-slice imaging", the signal is recorded from at least two slices alternatingly, i.e. completely independently of one another with a correspondingly longer scan time.

Known methods of these types, also known as simultaneous multislice (SMS) methods are, for example, the so-called Hadamard encoding, methods with simultaneous echo refocusing, methods with wideband data recording or methods which use parallel imaging in the slice direction. The latter methods include, for example, the CAIPIRINHA technique as described by Breuer et al. in "Controlled Aliasing in Parallel Imaging Results in Higher Acceleration (CAIPIRINHA) for Multi-Slice Imaging", Magnetic Resonance in Medicine 53, 2005, pp. 684-691 and the blipped CAIPIRINHA technique as described by Setsompop et al. in "Blipped-Controlled Aliasing in Parallel Imaging for Simultaneous Multislice Echo Planar Imaging With Reduced g-Factor Penalty", Magnetic Resonance in Medicine 67, 2012, pp. 1210-1224.

Particularly in the latter slice multiplexing method, a so-called multi-band RF pulse is used in order to excite two or more slices simultaneously or otherwise manipulate them, e.g. to refocus or saturate them. Such a multi-band RF pulse is, for example, a multiplex of individual RF pulses which would be used for manipulation of the individual slices to be manipulated simultaneously. By means of the multiplexing, for example, a baseband-modulated multi-band RF pulse is obtained from an addition of the pulse forms of the individual RF pulses. The position encoding of the recorded signals is achieved substantially by means of a commonly used gradient switching in two directions (two-dimensional gradient encoding).

The signals arising from all the excited slices are recorded collapsed in one dataset by means of a plurality of receiving antennae and then separated according to the individual slices, for example, with the aid of parallel acquisition techniques.

The aforementioned parallel acquisition techniques (PPA techniques) with the aid of which, in general, acquisition times for recording the desired data can be shortened by way of a sampling that is incomplete according to Nyquist, i.e. an undersampling of the k-space, include, for example GRAPPA ("GeneRalized Autocalibrating Partially Parallel Acquisition") and SENSE ("SENSitivity Encoding"). The scan points in the k-space that are not scanned during the undersampling are typically evenly distributed over the k-space to be scanned according to Nyquist with parallel acquisition techniques, so that for example every second k-space row is scanned. In addition, the "missing" k-space data is reconstructed in parallel acquisition techniques with the aid of coil sensitivity data. This coil sensitivity data of the receiving coils used during the recording of the scan data is established from reference scan data which samples fully according to the Nyquist condition at least a region of the k-space to be scanned, typically the central region.

In slice multiplexing methods, parallel acquisition techniques can be used in order to separate again the scan data recorded simultaneously, and therefore collapsed for different slices. Therein, reference scan data must be recorded for all the slices involved. This typically takes place in the context of a reference scan that is additionally to be performed, which measures the reference scan data individually for each required slice.

In order to be able to separate the resultant signals of the different slices, for example, a different phase is applied to each of the individual RF pulses before the multiplexing. This can take place, for example, by adding a phase which increases linearly (e.g. with the k-space coordinates in the phase encoding direction (ky)). In this way, each slice can have a different phase gradient applied to it, so that the slices are displaced against one another in the image space. This displacement is controlled by the so-called field of view (FOV) shift factor. How an optimal FOV shift factor can be determined is described, for example, in DE102016218955.

In the CAIPIRINHA methods described in the aforementioned articles by Breuer et al. and Setsompop et al., by switching additional gradient blips or by additional modulation of the phases of the RF pulses of the multi-band RF pulses between the simultaneously excited slices, alternating further phase shifts are applied which generate displacements in the image space in the slice direction ("interslice FoV shifts"). These additional displacements in the image space improve the quality of the separation of the signals of the slices, in particular if the coil sensitivities have such slight differences in the sensitivity profiles of the individual coils used, that they are not sufficient for a reliable separation of the slices. Thus, artifacts in the image data finally reconstructed from the recorded scan data are lessened.

The effect of the additional phase shifts on the sampling scheme of a two-dimensional (2D) slice multiplexing scan can be described as follows: by way of the additional phases which are applied in slice multiplexing CAIPIRNHA methods, the scan points with the additional phase applied are displaced by a displacement in the k-space in the kz-direction. How large this displacement in the kz-direction becomes depends upon the applied phase. This is also described, for example, in the article by Zahneisen et al.: "Three-Dimensional Fourier Encoding of Simultaneously Excited Slices: Generalized Acquisition and Reconstruction Framework", Magn. Reson. Med. 71, pp. 2071-2081 (2014). How it is possible to separate data recorded encoded in the slice direction and collapsed for a plurality of slices by means of a Fourier transform into scan data of the individual slices is described, for example, for turbo-spin-echo sequences in U.S. Ser. No. 10/557,903B2.

The reference scan data from which sensitivity data for separating the simultaneously recorded slices is acquired (slice separation reference scan data) has previously had to be scanned additionally for each SMS scan.

If, furthermore, an "in-plane" acceleration of the scan data for each slice is used by applying a parallel acquisition technique, further reference scan data must be recorded, from which, due to the scan data not recorded as a result of the dedicated undersampling of the k-space that is peculiar to the parallel acquisition technique, enhancement takes place (enhancement reference scan data).

Such enhancement reference scan data and/or slice separation reference scan data is usually recorded with an identical recording technique as the scan data in order to achieve the greatest possible compatibility with the scan data and thus better results from the enhancement and/or separation. In particular, when an epi recording technique is used in conjunction with slice multiplexing, due to the sensitivity to eddy currents mentioned above and possible delays to the switched gradients, it is advantageous if the reference scan data is also recorded by means of an epi sequence.

Furthermore, it can be advantageous to record the slice separation reference scan data and the enhancement reference scan data in separate recordings since, for example, different (under)sampling schemes can be used, which however leads to a different phase accumulation in each case.

In addition, in order, for example, to achieve a steady state, it can be necessary to carry out so-called dummy scans which already have the acquisition scheme of the subsequent recording of the scan data, the scan data of which, however, are typically discarded.

The additional recordings of the reference scan data and possibly of the dummy scans increases the total required recording time and the SAR (Specific Absorption Rate) loading when a slice multiplexing method is used and thus reduces the actually desired advantages in this method of a reduced scan time and SAR loading as compared with single-slice methods.

Figure 2:
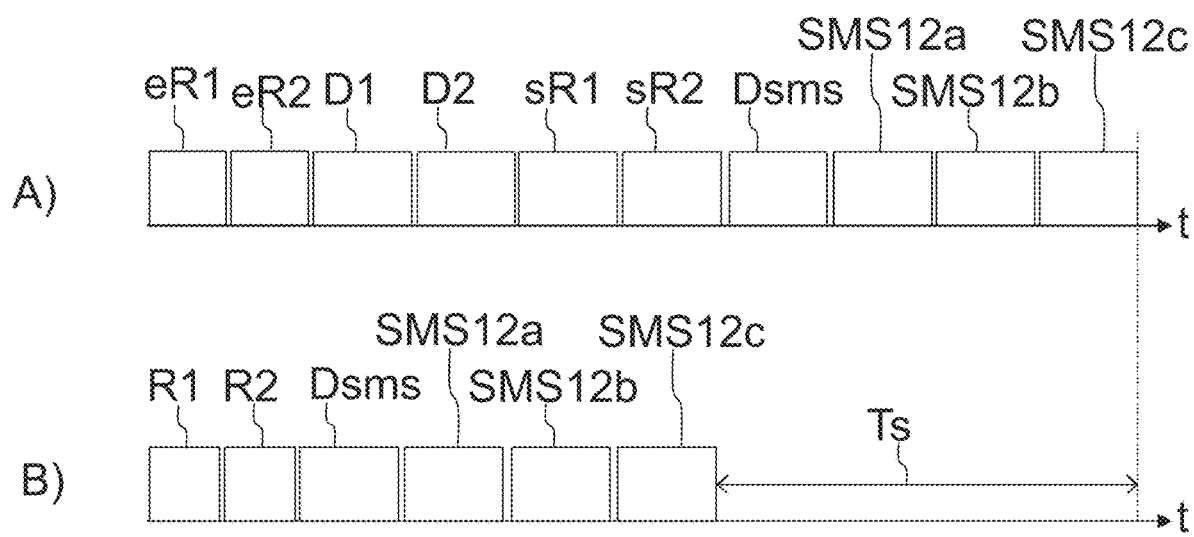
FIG. 2 shows sequences of scan blocks for recording reference scan data and scan data recorded by means of SMS in its temporal sequence, according to one or more exemplary embodiments of the disclosure.
Figure 3:
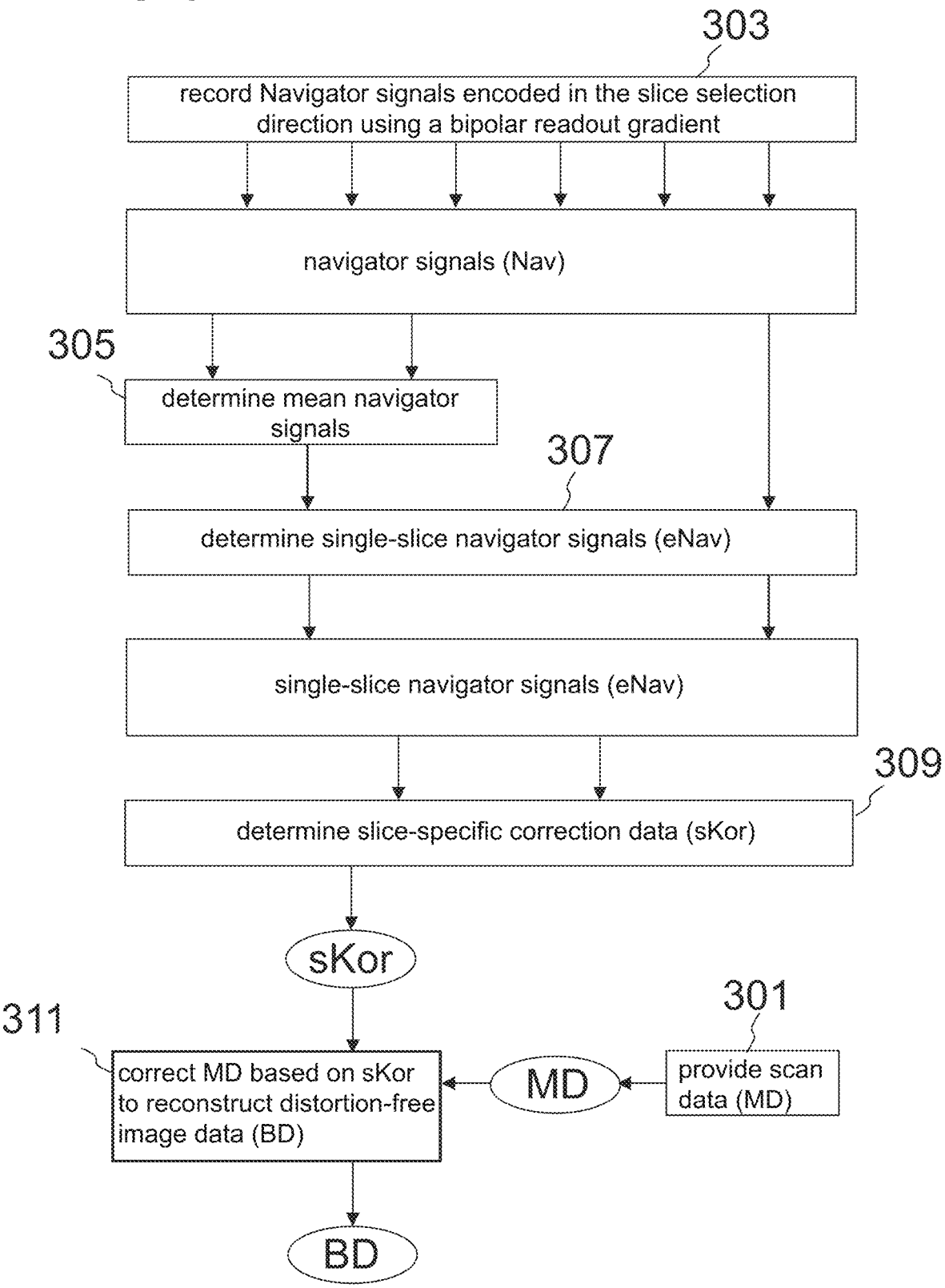
FIG. 3 is a flowchart of a method according to one or more exemplary embodiments of the disclosure.

Possible sequences of scan blocks for recording reference scan data and scan data recorded by means of SMS are illustrated in their temporal sequence in FIG. 2.

In the example shown, in the upper line A), firstly, enhancement reference scan data is recorded for a first slice eR1 and enhancement reference scan data is recorded for a second slice eR2. These two recording blocks are followed by two dummy scans D1, D2 which each create a steady state in one of the aforementioned slices. Following these dummy blocks D1 and D2, there follow recording blocks sR1, sR2 for recording slice separation reference scan data for the individual slices.

In the example shown, the duration of the recording blocks eR1 and eR2 for recording the enhancement reference scan data is shorter than the other recording blocks. This is intended to illustrate that for the recordings of the enhancement reference scan data, a different acquisition technique, for example a known gradient echo (GRE) technique has been used, than for the other recording blocks which use, for example, an EPI technique for recording. It should be noted here that the recording blocks D1, D2, sR1 and sR2 each excite only one of the slices mentioned and record the scan data generated, whereas from the recording block Dsms on, an (otherwise preferably identical) recording technique, for example an EPI technique, is used in order to utilize the aforementioned advantages. A use of a GRE technique for recording enhancement reference scan data is conventionally known for saving scan time.

After recording the slice separation reference scan data sR1, sR2, there follows a further dummy scan Dsms which converts the first and second slice from which scan data is subsequently simultaneously recorded, into a steady state. Thereafter, in the example shown, for simplification, three recording blocks SMS12a, SMS12b, SMS12c follow in which scan data is recorded in a collapsed form from the first slice and the second slice, and with the aid of the slice separation reference scan data, is then separated into scan data of the individual slices and, with the aid of the enhancement reference data, can be enhanced into complete scan data (as per Nyquist) in the k-space.

To reduce the total scan time, it is possible, as shown in line B) with the blocks R1 and R2, to record reference scan data separately for the first slice and the second slice which can be used both for the aforementioned slice separation and also for the aforementioned enhancement, by means of a GRE technique. In this way, the total scan time is reduced by the timespan Ts that is saved.

Navigator signals for correcting scan signals recorded by means of an EPI technique must themselves be recorded with an EPI technique, as described above in relation to FIG. 1. In a procedure according to that described in relation to FIG. 2A), navigator signals can thus be obtained from the slice separation reference scan data recorded in the recording blocks sR1 and sR2 if it has been recorded by means of an EPI technique. In a procedure according to FIG. 2 B), however, reference scan data recorded by means of a GRE technique is not suitable for establishing navigator signals.

If navigator signals are recorded by means of an SMS technique, they are available in a collapsed form for the simultaneously recorded slices. Correction factors can, in principle, be established from navigator signals recorded in collapsed form from different slices without phase encoding and applied equally for all the affected slices to the scan data of the corresponding slices. In this way, global effects can be corrected. A slice-specific correction is however not possible, due to the impossibility of separating the collapsed non-phase-encoded navigator signals recorded in collapsed form for a plurality of slices into navigator signals of the individual slices.

For example, for an application of a DORK correction as described above, for a plurality of slices, navigator signals that are available in collapsed form can also be used, since DORK corrections typically already average over the imaging volume. Since, however, navigator signals for correcting N/2 ghosts must be recorded without phase encoding gradients and no possibility is known for separating non-phase-encoded scan data recorded in collapsed form, such navigator signals recorded simultaneously for a plurality of slices in collapsed form are not suitable for a correction as described above of N/2 ghosts. For a correction of N/2 ghosts, navigator data must be acquired for each slice. Slice-specific navigator signals could, however, be obtained, for example, from a separately recorded slice-specific scan of reference scan data suitable for establishing navigator signals. However, this can lead to severe artifacts if the scan conditions of the scan data recorded for an imaging process change relative to the scan conditions in the recording of reference scan data for establishing navigator signals, e.g. by way of eddy current variations or movements of the examination object.

From U.S. Ser. No. 10/162,037B2, a method is known in which two sets of phase-encoded navigator signals with opposing polarity and the same strength are recorded in successive scans, in order, with the aid of recorded reference scan data, therefrom to determine non-phase-encoded navigator signals (associated with the central k-space row in the phase-encoding direction) which is suitable for correcting N/2 ghosts. However, the achievable temporal resolution is reduced by way of the required repeated recording of phase-encoded navigator signals, and at the same time an undesirable sensitivity to possible movements of the examination object, even to physiological movements such as breathing movements, is thereby increased. Furthermore, the necessary number of navigator signals corresponds to at least the reference scan data recorded in the phase-encoding direction. The scan time for the navigator signals should, however, be kept as short as possible to keep the total scan time low. Furthermore, in the method described, a minimum achievable echo time in the acquisition of scan data to be corrected is prolonged, since the gradients switched during the acquisition of the reference data must be prepared and possibly reversed such that overall, a zero-order moment accumulated in each gradient axis disappears.

U.S. Ser. No. 11/255,940B2 describes a method which combines a GRE reference scan (e.g. according to FIG. 2B)) with a series of recordings of single-slice navigator signals. Although the recordings of the single-slice navigator signals themselves only slightly increase the total scan duration, they do however lead to a disturbance of the steady state so that in order to compensate for this disturbance, further dummy scans are needed which further increase the total scan time.

For an SMS diffusion imaging process in which by means of an RF refocusing pulse, refocused echo signals are recorded as scan data for a plurality of slices in collapsed form, in US20220099780A1, a method is described which records navigator signals in a collapsed form between the excitation of the echo signals and the recording of the scan data, which (as in U.S. Ser. No. 10/162,037B2) must still be separated into the respective slices. The method is usable only when using RF refocusing pulses.

An object of the disclosure is to enable a correction of phase errors in EPI recordings of MR data accelerated by means of slice multiplexing methods, for example for correcting N/2 ghosts and/or drift effects efficiently, slice-specifically and with the shortest possible total scan time.

The object is achieved by a method for slice-specific correction of scan data of an examination object recorded for at least two slices simultaneously by means of an EPI SMS technique according to one or more aspects of the disclosure, a magnetic resonance system according to one or more aspects of the disclosure, a computer program according to one or more aspects of the disclosure, and an electronically readable data carrier according to one or more aspects of the disclosure.

A method according to an exemplary embodiment of the disclosure, for slice-specific correction of scan data recorded for at least two slices simultaneously of an examination object by means of an echo-planar (EPI) simultaneous multi-slice (SMS) technique, may include:
  recording navigator signals encoded in the slice selection direction using a bipolar readout gradient, and simultaneously for the at least two slices temporally after an RF excitation pulse radiated into the examination object and temporally before the recording of scan data to be corrected, wherein for each slice selection encoding that is used, at least two navigator signals with different polarity of the readout gradient and overall at least six navigator signals are recorded,
  determining at least one mean navigator signal from at least two of the recorded navigator signals of the same polarity,
  determining single-slice navigator signals by applying a Fourier transform to the mean navigator signal of the second polarity and a navigator signal of the first polarity,
  determining slice-specific correction data from the single-slice navigator signals, and
  correcting scan data that is to be corrected by means of the slice-specific correction data.

Image data reconstructed from scan data corrected with slice-specific correction data according to the disclosure has a high image quality, since the correction takes place adapted for the individual slices. In addition, for obtaining slice-specific correction data from the navigator signals recorded for at least two slices simultaneously and thus in collapsed form, no scan of reference scan data for slice separation is required.

The recording of navigator signals according to the disclosure can take place, for example, temporally between an RF excitation pulse and the train of echo signals associated with the RF excitation pulse if a timing of a pulse sequence scheme that is used makes sufficient temporal space available for the recording according to the disclosure of the navigator signals. This can be the case, in particular, if no minimal echo times are used, e.g. in order to generate a particular contrast or also with diffusion scans with a diffusion value of b=0. In this way, the recording of the navigator signals takes place within a recording block in which the scan data to be corrected is also recorded, e.g. in one or more or all of the recording blocks SMS12a, SMS12b, SMS12c of FIG. 2B).

Additionally, or alternatively, a recording of navigator signals according to the disclosure can take place in the context of a dummy scan carried out before the generation of the scan data to be corrected, said dummy scan serving for establishing a steady state, for example in a recording block Dsms as shown in FIG. 2B). Such dummy scans already use the same recording technique as the following recording of scan data to be corrected and thus have, in particular, the same temporal sequence of RF pulses and recording windows and thus have plentifully available recording time in order also to allow a recording of longer trains of navigator signals. Therein, the navigator signals can even be recorded at a selectable echo time TE in the context of the repetition time TR of the pulse sequence being used. In general, the navigator signals can be recorded within a repetition time TR of a pulse sequence being used, in particular an EPI-SMS pulse sequence.

Thus, the recording of the navigator signals can take place without the total scan time being extended.

A magnetic resonance system according to the disclosure comprises a magnet unit, a gradient unit, a high frequency unit and a control apparatus (controller) with a correction data determining unit designed for carrying out a method according to the disclosure.

A computer program according to the disclosure implements a method according to the disclosure on a controller when it is executed on the controller.

Herein, the computer program can also be available in the form of a computer program product which is directly loadable into a memory store of a controller, having program code means in order to carry out a method according to the disclosure when the computer program product is executed in the computing unit of the computing system.

An electronically readable data carrier according to the disclosure comprises electronically readable control information stored thereon, which comprises at least one computer program according to the disclosure and is configured such that, when the data carrier is used in a controller of a magnetic resonance system, it carries out a method according to the disclosure.

The advantages and embodiments set out in relation to the method apply accordingly to the magnetic resonance system, the computer program product and the electronically readable data carrier.

Scan data MD to be corrected is generated and loaded (block 301). This can take place by way, in each case following an RF excitation pulse, of the generation of a train of a plurality of echo signals in a number N, wherein N is at least two, of different slices of the examination object (U) and recording the echo signals while switching gradients with alternating polarity for successive echo signals, wherein one of also N different phases is applied to each of successive echo signals, and acquiring the simultaneously recorded echo signals for the at least two slices as scan data in a scan dataset takes place.

Navigator signals encoded in the slice selection direction are recorded using a bipolar readout gradient, and simultaneously for the at least two slices temporally after an RF excitation pulse radiated into the examination object and temporally before the recording of scan data to be corrected, wherein for each slice selection encoding that is used, at least two navigator signals with different polarity of the readout gradient and overall at least six navigation signals are recorded (block 303).

Figure 4:
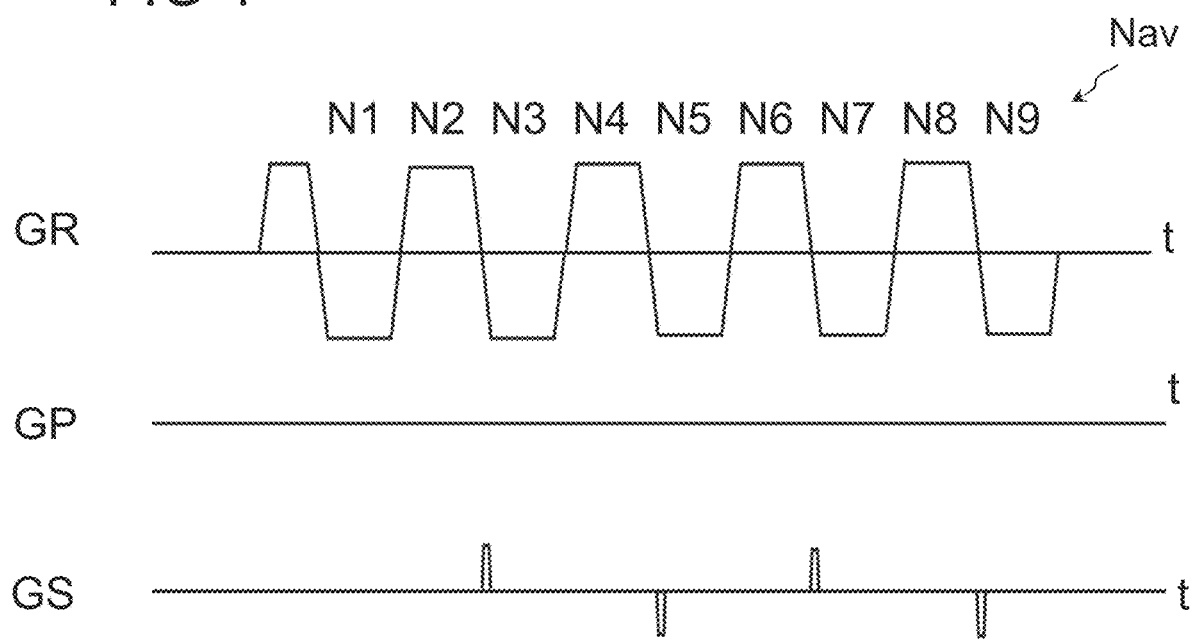
FIG. 4 shows a schematic illustration of an exemplary portion of a pulse sequence scheme for the acquisition of navigator signals according to one or more exemplary embodiments of the disclosure.

FIG. 4 shows, by way of example, a portion of a pulse sequence scheme for acquisition of navigator signals according to the disclosure. In the example shown, navigator signals N1, N2, N3, N4, N5, N6, N7, N8 and N9 are recorded. Therein, as is usual in EPI techniques, a bipolar readout gradient is switched in the readout direction GR, wherein for each "plateau" of the readout gradient, a navigator signal is recorded. No gradients are switched in the phase encoding direction GP, so that the navigator signals are not phase encoded and in the readout direction phase encoding plane (kx-ky), the central k-space row is recorded, in each case, with an alternating readout direction according to the polarity of the readout gradient. However, GS gradients are switched in the slice selection direction in order to obtain differently encoded navigator signals in the slice selection direction. The switching of gradients in the slice selection direction GS as shown has the result that the first two navigator signals N1 and N2 do not receive any phase applied to them in the slice selection direction, however the navigator signals 3 and 4 receive a certain encoding in the slice selection direction and the next two navigator signals are brought, by way of the gradients switched in the slice selection direction before the navigator signal N5 into the phase of the first two navigator signals again, and so forth. Thus, at least two successive navigator signals are encoded with the same slice selection encoding, by way of which (and by way of the bipolar readout gradients) pairs of navigator signals are obtained which have an identical slice selection encoding but different polarities.

The example in FIG. 4 could be a portion of a readout train of a dummy scan which is carried out to establish a steady state before the execution of the actual scan in a repetition of the EPI-SMS pulse sequence scheme.

It is also conceivable that the example of FIG. 4 shows a portion of a repetition of an EPI SMS pulse sequence which is arranged temporally between an RF excitation pulse and the train of echo signals which are associated with the RF excitation pulse and are acquired as scan data.

The example shown in FIG. 4 serves to illustrate the underlying principle. A plurality of variants in the switching of the gradients is herein conceivable. Further examples are also indirectly given later on the basis of the representations of exemplary k-spaces filled with navigator data according to the disclosure, referring to FIGS. 5 to 7.

Figure 5:
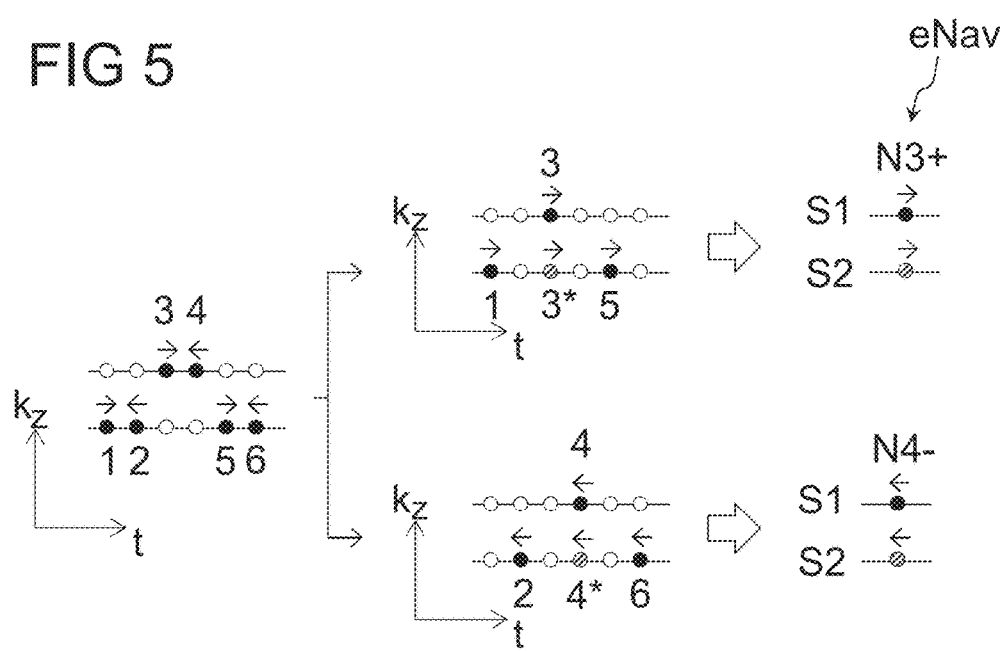
FIGS. 5-7 show schematic representations of exemplary k-spaces filled with navigator data according to one or more exemplary embodiments of the disclosure.

FIG. 5 shows, at left, a representation of a kz-t-space illustrating how the central k-space row is sampled over time by the navigator signals. In this representation, the readout direction kx is perpendicular to the plane of the drawing. In order nevertheless to be able to specify the respective readout direction, arrows over the k-space rows acquired with a navigator signal and shown as points filled with black represent the respective readout direction. In the slice selection direction kz, the encoding is given in the slice selection direction.

The example shown at left in FIG. 5 of the k-space rows 1 to 6 could take place, for instance, by recording navigator signals N1 to N6 (e.g. as represented in FIG. 4).

In order to illustrate the determination of mean navigator signals from at least two of the recorded navigator signals of the same polarity (block 305), in FIG. 5, center, the k-space rows shown at left are again represented separated according to the readout direction (and thus the polarity of the readout gradients used in the recording). At top, the k-space rows with positive readout direction (arrow pointing right) and below, the k-space rows with a negative readout direction (arrow pointing left) are shown. By way of an averaging, for example, of the k-space rows 1 and 5 corresponding to the navigator signals N1 and N5 and having an identical slice selection encoding, for this slice selection encoding, a mean navigator signal illustrated by way of the k-space row 3*  represented as a shaded point can be determined.

An averaged effective echo time of the navigator signal averaged from the navigator signals N1 and N5 and represented by way of the k-space row 3* coincides with the echo time of the navigator signal N3 which was recorded with a different slice selection encoding but with the same polarity.

Similarly, by way of an averaging, for example, of the k-space rows 2 and 6 corresponding to the navigator signals N2 and N6 and having an identical slice selection encoding, for this slice selection encoding, a mean navigator signal illustrated by way of the k-space row 4* represented as a shaded point can be determined.

An averaged effective echo time of the navigator signal averaged from the navigator signals N2 and N6 and represented by way of the k-space row 4* coincides with the echo time of the navigator signal N4 which was recorded with a different slice selection encoding but with the same polarity.

The navigator signals can generally be recorded such that pairs of navigator signals with a common slice selection encoding and with a common polarity have an averaged effective echo time which coincides with the echo time of a further navigator signal with a different slice selection encoding but with the common polarity.

By applying a Fourier transform to a navigator signal which has been recorded with a first polarity and a first slice selection encoding and a navigator signal which has been recorded with the same polarity but with a different slice selection encoding, single-slice navigator signals eNav can be determined (block 307).

Drawing upon the example in FIG. 5, it can be seen that single-slice navigator signals eNav can be determined for a positive polarity by way of a Fourier transform in the slice selection direction of the mean navigator signal (with kz=0) represented by the k-space row 3* and of the navigator signal N3 (with kz≠0) single-slice navigator signals eNav S3+ for both slices S1 and S2.

Similarly, for a negative polarity by way of a Fourier transform in the slice selection direction of the mean navigator signal (with kz=0) represented by the k-space row 4* and of the navigator signal N4 (with kz≠0), single-slice navigator signals eNav S4− can be determined for both slices S1 and S2.

From the single-slice navigator signals eNav, slice-specific correction data sKor is determined (block 309). Therein, in particular in accordance with the method described in the aforementioned U.S. Pat. No. 6,043,651, the procedure for correcting N/2 ghosts can take place. On the basis of the available collapsed navigator signals N1 and N5 of FIG. 5, a global drift correction can already be carried out. It is also possible to determine slice-specific correction data according to a DORK method as described in the aforementioned U.S. Pat. No. 9,329,254B2. This is described in more detail below referring to FIG. 7.

Taking the example of FIG. 5 again, for this purpose, the single-slice navigator signals eNav N3+ and N4− determined for the slices S1 and S2 respectively could be processed with one another slice-wise.

In the case described in relation to FIG. 5, the effective echo times of the single-slice navigator signals eNav thus obtained do not match exactly, as indicated merely by the designations N3+ and N4−. However, they are also close enough to one another to achieve good results for a correction of N/2 ghosts.

In general, the navigator signals should be recorded such that pairs of navigator signals exist with a common slice selection encoding and with a common polarity, the averaged effective echo time of which has a temporal separation from a mean echo time of all the recorded navigator signals which corresponds maximally to the temporal separation of two successive navigator signals.

Scan data MD to be corrected is corrected by means of the slice-specific correction data sKor (block 311), wherein distortion-free image data BD can be reconstructed from the corrected scan data.

Figure 6:
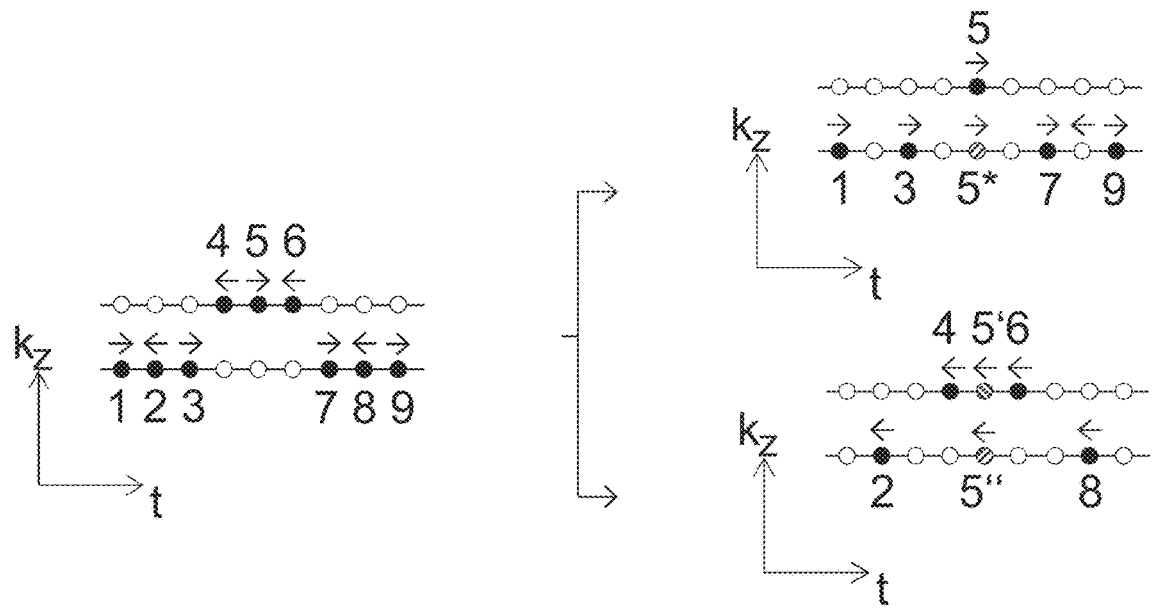

FIG. 6 shows a further example of a schematically illustrated k-space filled over time with navigator data according to the disclosure. The notation corresponds to that set out in relation to FIG. 5. As can be seen in FIG. 6 at right, in this example, altogether nine navigator signals are recorded, which are shown by way of the respective k-space rows 1 to 9 as points filled with black. In this example, three navigator signals are recorded with an identical slice selection encoding and also by way of the bipolar readout gradient in alternating readout directions.

By way of the recording of an odd number of navigator signals, it is possible to achieve that pairs of navigator signals with a common slice selection encoding and with a common polarity exist, the averaged effective echo time of which has a temporal separation from a mean echo time of all the recorded navigator signals, which separation disappears. I.e. the effective echo time of averaged navigator signals of the same polarity and the same slice selection encoding and the mean echo time of all the recorded navigator signals can coincide.

In FIG. 6, at right, the k-space rows shown at left are again represented separated according to the readout direction (and thus the polarity of the readout gradients used in the recording).

By way of an averaging, for example, of the k-space rows 1 and 9 corresponding to the navigator signals N1 and N9 and/or of the k-space rows 3 and 7 corresponding to the navigator signals N3 and N7, each having an identical slice selection encoding, for this slice selection encoding, a mean navigator signal illustrated by way of the k-space row 5* represented as a shaded point can be determined.

An averaged effective echo time of the navigator signal averaged from the navigator signals N1 and N9 and/or N3 and N7 and represented by way of the k-space row 5* coincides with the echo time of the navigator signal N5 which was recorded with a different slice selection encoding but with the same polarity.

Navigator signals can thus also be recorded in such a way that at least two pairs of navigator signals with a common slice selection encoding and with a common polarity each have an averaged effective echo time which coincides with the echo time of a respective further navigator signal having a different slice selection encoding but with the common polarity. Thus, a further averaging can take place and/or more data can be averaged.

By way of an averaging of the k-space rows 2 and 8 corresponding to the navigator signals N2 and N8 which have an identical slice selection encoding, for this slice selection encoding, a mean navigator signal illustrated by way of the k-space row 5" represented as a shaded point can be determined.

An averaged effective echo time of the navigator signal averaged from the navigator signals N2 and N8 and represented by way of the k-space row 4* coincides with the echo time of the navigator signal N5 which was recorded in this case with a different slice selection encoding but also with a different polarity. However, by way of an averaging of the k-space rows 4 and 6 corresponding to the navigator signals N4 and N6 which have an identical slice selection encoding, for this slice selection encoding, a mean navigator signal illustrated by way of the k-space row 5' represented as a point shaded in the other direction can be determined, which has the same polarity as the averaged navigator signal represented by the k-space row 5*.

The navigator signals can generally be recorded such that pairs of navigator signals with a common slice selection encoding and with a common polarity have an averaged effective echo time which coincides with the echo time of a further navigator signal with a different slice selection encoding but with the common polarity or with an averaged effective echo time of a pair of navigator signals with a different slice selection encoding but with the common polarity.

Figure 7:
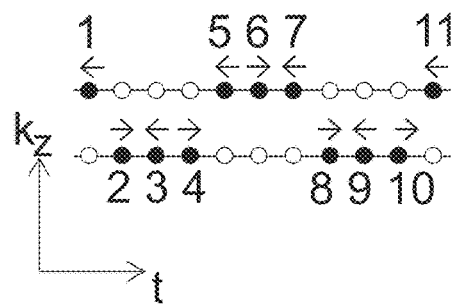

FIG. 7 shows a further example of a schematically illustrated k-space filled over time with navigator data according to the disclosure. As compared with the example shown in FIG. 6, herein a new first and a new last navigator signal N1 and N11 are added which by way of the navigator signals N2 to N10 represented by the k-space rows 2 to 10, correspond to the k-space rows 1 to 9 and the navigator signals N1 to N9 of FIG. 6.

With navigator signals recorded according to the example of FIG. 7, similarly to FIG. 6, single-slice navigator signals can be determined which can be used for a correction of N/2 ghosts. However, it is also possible to determine slice-specific correction data which can be used for a drift correction, for example, on the basis of a DORK method. For this purpose, for example, firstly the navigator signals N1 and N5 of the example in FIG. 7 can be averaged and thus, with an effective echo time coinciding with the echo time of the navigator signal N3, can be processed with the navigator signal N3 to single-slice navigator signals, and secondly, the then navigator signals N7 and N11 can be averaged and thus, with an effective echo time coinciding with the echo time of the navigator signal N9, can be processed with the navigator signal N9 to single-slice navigator signals. Thus, single-slice navigator data of the same slice selection encoding and the same polarity are available for different echo times.

Building upon the example shown in FIG. 5 with six navigator signals, of which in each case, two successive signals have the same slice selection encoding applied to them, by adding three further navigator signals N7 to N9 in an otherwise identical scheme, it is possible that single-slice navigator signals which are suitable for carrying out a DORK method can also be obtained in that firstly, the then navigator signals N1 and N5 are averaged and thus, with an effective echo time coinciding with the echo time of the navigator signal N3, can be processed with the navigator signal N3 to single-slice navigator signals, and secondly, the then navigator signals N5 and N9 can be averaged and thus, with an effective echo time coinciding with the echo time of the navigator signal N7, can be processed with the navigator signal N7 to single-slice navigator signals. Thus, here also single-slice navigator data of the same slice selection encoding and the same polarity is available for different echo times and can be utilized for the drift correction.

Thus, in order to enable a slice-specific drift correction reliably, the navigator signals can be recorded such that pairs of navigator signals exist with a common slice selection encoding and with a common polarity, the averaged effective echo time of which coincides with an echo time of a further navigator signal with a different slice selection encoding, but with the common polarity, but which has a temporal separation from a mean echo time of all the recorded navigator signals, said separation being greater than the temporal separation of two successive navigator signals, e.g. greater than twice the temporal separation of two successive navigator signals.

Figure 8:
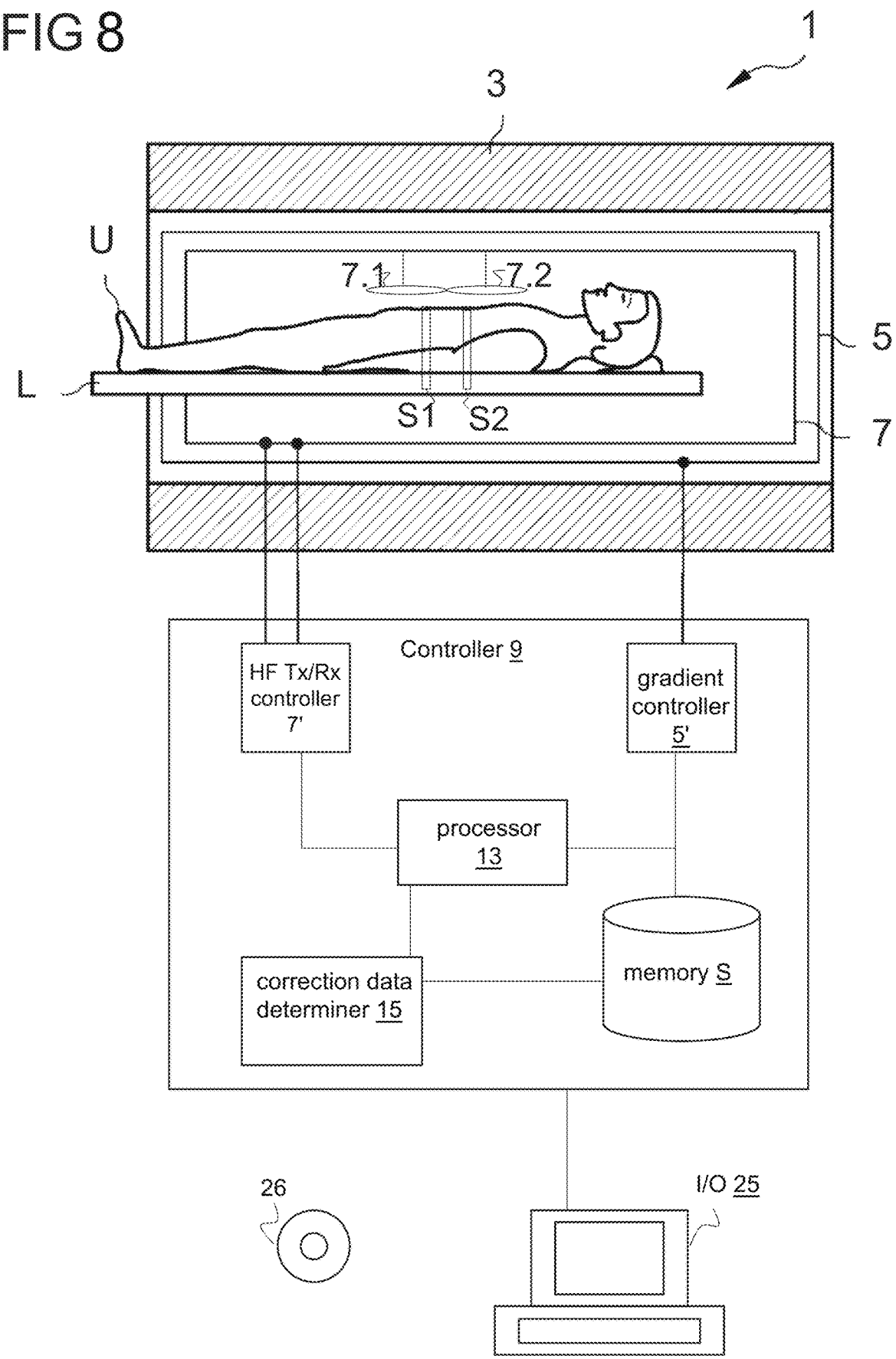
FIG. 8 shows a schematic representation of a magnetic resonance system according to one or more exemplary embodiments of the disclosure.

FIG. 8 shows schematically a magnetic resonance (MR) system 1 according to the disclosure. The MR system 1 may include a magnet unit 3 for generating the main magnetic field, a gradient unit 5 for generating the gradient fields, a high frequency unit 7 for radiating in and receiving high frequency signals and a control apparatus (controller) 9 configured for carrying out a method according to the disclosure. The magnet unit 3, gradient unit 5, and high frequency unit 7 may collectively be referred to as a scanner.

In FIG. 8, these subunits of the magnetic resonance system 1 are shown only roughly schematically. In particular, the high frequency unit 7 can consist of a plurality of subunits, for example, a plurality of coils such as the schematically shown coils 7.1 and 7.2 or more coils which can be configured either only to transmit high frequency signals or only to receive the triggered high frequency signals or for both.

In order to examine an examination object U, for example, a patient or a phantom, it can be introduced on a support L into the magnetic resonance system 1, in the scanning volume thereof. The slice or the slab Si represents an exemplary target volume of the examination object from which echo signals are to be recorded and captured as scan data.

The controller 9 may be configured to control the magnetic resonance system 1 and can, in particular, control the gradient unit 5 by means of a gradient controller 5' and the high frequency unit 7 by means of a high frequency transmitting/receiving (transceiver) controller 7'. The high frequency unit 7 can herein comprise a plurality of channels on which signals can be transmitted or received. In an exemplary embodiment, the controller 9 (and/or one or more components comprised therein) may include processing circuitry that is configured to perform one or more functions and/or operations of the controller 9 and/or respective functions/operations of the component(s) therein.

The high frequency unit 7 is responsible, together with its high frequency transmitting/receiving controller 7' for the generation and radiating-in (transmission) of a high frequency alternating field for manipulation of the spins in a region to be manipulated (for example, in slices S to be scanned) of the examination object U. Herein, the center frequency of the high frequency alternating field, also designated the B1 field, is typically adjusted so that, as far as possible, it lies close to the resonance frequency of the spin to be manipulated. Deviations of the center frequency from the resonance frequency are referred to as off-resonance. In order to generate the B1 field, in the high frequency unit 7, currents controlled by means of the high frequency transmitting/receiving controller 7' are applied to the HF coils.

Furthermore, the controller 9 comprises a correction data determining unit (correction data determiner) 15 with which correction data according to the disclosure for correcting phase errors in scan data recorded by means of an EPI-(SMS) technique can be determined. The controller 9 is configured overall to carry out a method according to the disclosure.

A computing unit (also referred to as computer, processor, or processing circuitry) 13 included in the controller 9 is configured to carry out all the computation operations necessary for the required scans and determinations. Intermediate results and results needed for this or established herein can be stored in a memory storage unit S of the controller 9. The units mentioned are herein not necessarily to be understood as physically separate units, but represent merely a subdivision into units of purpose which, however, can also be realized, for example, in fewer, or even only in one single, physical unit.

By way of an input/output apparatus (I/O interface) 25 of the magnetic resonance system 1, for example, control commands can be passed by way of a user to the magnetic resonance system and/or results from the controller 9 such as, for example, image data can be displayed.

A method described herein can also exist in the form of a computer program product which comprises a program and implements the described method on a controller 9 when said program is executed on the controller 9. An electronically readable data carrier (computer-readable medium) 26 with electronically readable control information stored thereon can also be provided, said control information comprising at least one computer program product as described above and being configured to carry out the method described when the data carrier 26 is used in a controller 9 of a magnetic resonance system 1.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:
1. A method for slice-specific correction of scan data recorded for at least two slices simultaneously of an exami- nation object using an echo-planar (EPI) simultaneous multi-slice (SMS) technique, the method comprising:

simultaneously recording navigator signals encoded in a slice selection direction using a bipolar readout gradient for the at least two slices temporally after a radio-frequency (RF) excitation pulse radiated into the examination object and temporally before the recording of scan data to be corrected, wherein, for each slice selection encoding that is used, at least two navigator signals with a different polarity of the readout gradient are recorded, at least six navigator signals being recorded overall, determining at least one mean navigator signal from at least two of the recorded navigator signals of a same polarity, determining single-slice navigator signals based on the mean navigator signal and a navigator signal having been recorded with the same polarity as the at least one mean navigator signal, but with a different slice selection encoding, determining slice-specific correction data from the single-slice navigator signals, and correcting scan data based on the slice-specific correction data, wherein the navigator signals are recorded such that pairs of navigator signals with a common slice selection encoding and with a common polarity have an averaged effective echo time which coincides with:

an echo time of a further navigator signal with a different slice selection encoding but with the common polarity, or an averaged effective echo time of a pair of navigator signals with a different slice selection encoding but with the common polarity.

2. A magnetic resonance (MR) system comprising:
a scanner; and
a controller configured to:
control the scanner to simultaneously record navigator signals encoded in a slice selection direction using a bipolar readout gradient for the at least two slices temporally after a radio-frequency (RF) excitation pulse radiated into an examination object and temporally before the recording of scan data to be corrected, wherein, for each slice selection encoding that is used, at least two navigator signals with a different polarity of the readout gradient are recorded, at least six navigator signals being recorded overall, determine at least one mean navigator signal from at least two of the recorded navigator signals of a same polarity, determine single-slice navigator signals based on the mean navigator signal and a navigator signal having been recorded with the same polarity as the at least one mean navigator signal, but with a different slice selection encoding, determine slice-specific correction data from the single-slice navigator signals, and correct scan data based on the slice-specific correction data, wherein the navigator signals are recorded such that pairs of navigator signals with a common slice selection encoding and with a common polarity have an averaged effective echo time which coincides with:

an echo time of a further navigator signal with a different slice selection encoding but with the common polarity, or an averaged effective echo time of a pair of navigator signals with a different slice selection encoding but with the common polarity.

3. A controller for a magnetic resonance (MR) system, comprising:
one or more processors; and
memory storing instructions that, when executed by the one or more processors, configure the controller to:
simultaneously record navigator signals encoded in a slice selection direction using a bipolar readout gradient for the at least two slices temporally after a radio-frequency (RF) excitation pulse radiated into an examination object and temporally before the recording of scan data to be corrected, wherein, for each slice selection encoding that is used, at least two navigator signals with a different polarity of the readout gradient are recorded, at least six navigator signals being recorded overall, determine at least one mean navigator signal from at least two of the recorded navigator signals of a same polarity, determine single-slice navigator signals based on the mean navigator signal and a navigator signal having been recorded with the same polarity as the at least one mean navigator signal, but with a different slice selection encoding, determine slice-specific correction data from the single-slice navigator signals, and correct scan data based on the slice-specific correction data, wherein the navigator signals are recorded such that pairs of navigator signals with a common slice selection encoding and with a common polarity have an averaged effective echo time which coincides with:

an echo time of a further navigator signal with a different slice selection encoding but with the common polarity, or an averaged effective echo time of a pair of navigator signals with a different slice selection encoding but with the common polarity.

4. The method as claimed in claim 1, wherein the single-slice navigator signals are determined based on a Fourier transformation of the mean navigator signal and the navigator signal having been recorded with the same polarity as the at least one mean navigator signal.

5. The method as claimed in claim 1, wherein the scan data to be corrected is generated, in each case, following an RF excitation pulse, based on a generation of a train of a plurality of echo signals in a number N of different slices of the examination object and recording the echo signals while switching gradients with alternating polarity for successive echo signals, wherein N is at least two, one of also N different phases being applied, in each case, to successive echo signals, and the simultaneously recorded echo signals for the at least two slices being acquired as scan data in a scan dataset.

6. The method as claimed in claim 1, wherein at least two successive navigator signals are encoded with the same slice selection encoding.

7. The method as claimed in claim 1, wherein an odd number of navigator signals is recorded.

8. The method as claimed in claim 1, wherein pairs of navigator signals exist with a common slice selection encoding and with a common polarity, the averaged effective echo time of which has a temporal separation from a mean echo time of all the recorded navigator signals which corresponds maximally to the temporal separation of two successive navigator signals.

9. The method as claimed in claim 1, wherein pairs of navigator signals exist with a common slice selection encoding and with a common polarity, the averaged effective echo time of which coincides with an echo time of a further navigator signal with a different slice selection encoding, but with the common polarity, but which has a temporal separation from a mean echo time of all the recorded navigator signals, the temporal separation being greater than a temporal separation of two successive navigator signals.

10. The method as claimed in claim 1, wherein the navigator signals are recorded such that at least two pairs of navigator signals with a common slice selection encoding and with a common polarity each have an averaged effective echo time which coincides with an echo time of a further navigator signal with a different slice selection encoding but with the common polarity.

11. The method as claimed in claim 1, wherein the navigator signals are recorded temporally between the RF excitation pulse and a train of echo signals associated with the RF excitation pulse.

12. The method as claimed in claim 1, wherein the navigator signals are recorded in a dummy scan carried out before generation of the scan data to be corrected, the dummy scan being configured to establish a steady state.

13. The method as claimed in claim 1, wherein the navigator signals are recorded within a repetition time of the EPI-SMS technique that is used.

14. A non-transitory computer-readable storage medium with an executable program stored thereon, that when executed, instructs a processor to perform the method of claim 1.

15. The MR system as claimed in claim 2, wherein the scanner comprises a magnet unit, a gradient unit, and a high frequency unit.

16. The controller as claimed in claim 3, wherein pairs of navigator signals exist with a common slice selection encoding and with a common polarity, the averaged effective echo time of which has a temporal separation from a mean echo time of all the recorded navigator signals which corresponds maximally to the temporal separation of two successive navigator signals.

17. The controller as claimed in claim 3, wherein pairs of navigator signals exist with a common slice selection encoding and with a common polarity, the averaged effective echo time of which coincides with an echo time of a further navigator signal with a different slice selection encoding, but with the common polarity, but which has a temporal separation from a mean echo time of all the recorded navigator signals, the temporal separation being greater than a temporal separation of two successive navigator signals.

18. The MR system as claimed in claim 2, wherein pairs of navigator signals exist with a common slice selection encoding and with a common polarity, the averaged effective echo time of which has a temporal separation from a mean echo time of all the recorded navigator signals which corresponds maximally to the temporal separation of two successive navigator signals.

19. The MR system as claimed in claim 2, wherein pairs of navigator signals exist with a common slice selection encoding and with a common polarity, the averaged effective echo time of which coincides with an echo time of a further navigator signal with a different slice selection encoding, but with the common polarity, but which has a temporal separation from a mean echo time of all the recorded navigator signals, the temporal separation being greater than a temporal separation of two successive navigator signals.

20. The method as claimed in claim 9, wherein the temporal separation is greater than twice the temporal separation of two successive navigator signals.

* * * * *